US012792501B2

(12) United States Patent
Kim et al.

(10) Patent No.: US 12,792,501 B2
(45) Date of Patent: Nov. 10, 2026

(54) CONTROL DEVICE, MEMORY SYSTEM, AND COMPUTING SYSTEM

(71) Applicant: SK hynix Inc., Icheon-si (KR)

(72) Inventors: Bo Ra Kim, Icheon-si (KR); Myeong Jae Kim, Icheon-si (KR)

(73) Assignee: SK hynix Inc., Icheon-si (KR)

( * ) Notice: Subject to any disclaimer, the term of this patent is extended or adjusted under 35 U.S.C. 154(b) by 0 days.

(21) Appl. No.: 18/984,120

(22) Filed: Dec. 17, 2024

(65) Prior Publication Data

US 2026/0030150 A1 Jan. 29, 2026

(30) Foreign Application Priority Data

Jul. 29, 2024 (KR) ........................ 10-2024-0100427

(51) Int. Cl.
*G06F 12/02* (2006.01)

(52) U.S. Cl.
CPC ................................ *G06F 12/0223* (2013.01)

(58) Field of Classification Search
CPC .................................................. G06F 12/0223
USPC ......................................................... 711/154
See application file for complete search history.

(56) References Cited

U.S. PATENT DOCUMENTS

2006/0168400 A1* 7/2006 Ronciak .................. H04L 49/90
711/E12.057
2017/0230863 A9 8/2017 Das et al.
2018/0159803 A1* 6/2018 Cornett .................. H04L 69/16

FOREIGN PATENT DOCUMENTS

KR 10-2017-0012400 A 2/2017
KR 10-2017-0042946 A 4/2017
KR 10-2019-0099879 A 8/2019

* cited by examiner

*Primary Examiner* — Gautam Sain

(57) ABSTRACT

A controller of a memory system may variably set a starting point of a header region, of a payload region, or both of a buffer storing messages received from a host device, so that it is possible to flexibly adjust the size of a region storing different types of messages using a limited buffer, and process the messages without omission, thereby improving an operating performance of the memory system.

17 Claims, 11 Drawing Sheets

<Default>

<Case A>

<Case B>

<Default>

<Case A>

<Case B>

<CXL Power Management Message Packet Format>

<MCTP over PCI Express Vendor Defined Message (VDM) packet format>

CONTROL DEVICE, MEMORY SYSTEM, AND COMPUTING SYSTEM

CROSS-REFERENCE TO RELATED APPLICATION

The present application claims priority under 35 U.S.C. 119(a) to Korean patent application number 10-2024-0100427 filed on Jul. 29, 2024, which is incorporated herein by reference in its entirety.

TECHNICAL FIELD

Embodiments of the present disclosure relate to a control device, a memory system, and a computing system.

BACKGROUND

A memory system may include at least one memory for storing data. The memory system may include a controller for controlling the operation of at least one memory.

The controller may control the operation of the memory based on a command received from an external device, for example. In addition, the controller may control the operation of the memory according to an internal command.

The controller may receive various messages for management or control from an external device and perform control operations according to the various messages. Since the controller may receive various types of messages, there is required a method for efficiently processing various types of messages.

SUMMARY

Embodiments of the disclosure may provide a method for efficiently processing control operations by a memory system according to various types of messages received from an external device.

Embodiments of the disclosure may provide a memory system including at least one memory storing data, and a controller including a buffer storing at least a part of a message received from an external device, and configured to store a first message of a first type in a first region of the buffer and store a second message of a second type in a second region continuous with the first region of the buffer, and variably set a starting point of the first region, a starting point of the second region, or both.

Embodiments of the disclosure may provide a control device including a buffer including a first region storing a first message of a first type and a second region storing a second message of a second type, and a control circuit configured to store at least a part of the first message and the second message received from an external device in the buffer, and variably set a starting point of the first region, a starting point of the second region, or both.

Embodiments of the disclosure may provide a computing system including a host device for transmitting a first message of a first type and a second message of a second type to the outside, and a memory device including a buffer with a first region storing the first message and a second region storing the second message, and configured to variably set a starting point of the first region, a starting point of the second region, or both and to process the first message and the second message.

According to embodiments of the present disclosure, a memory system may efficiently manage various types of messages received from an external device using a limited buffer and perform a control operation according to the messages.

DETAILED DESCRIPTION

Figure 1:
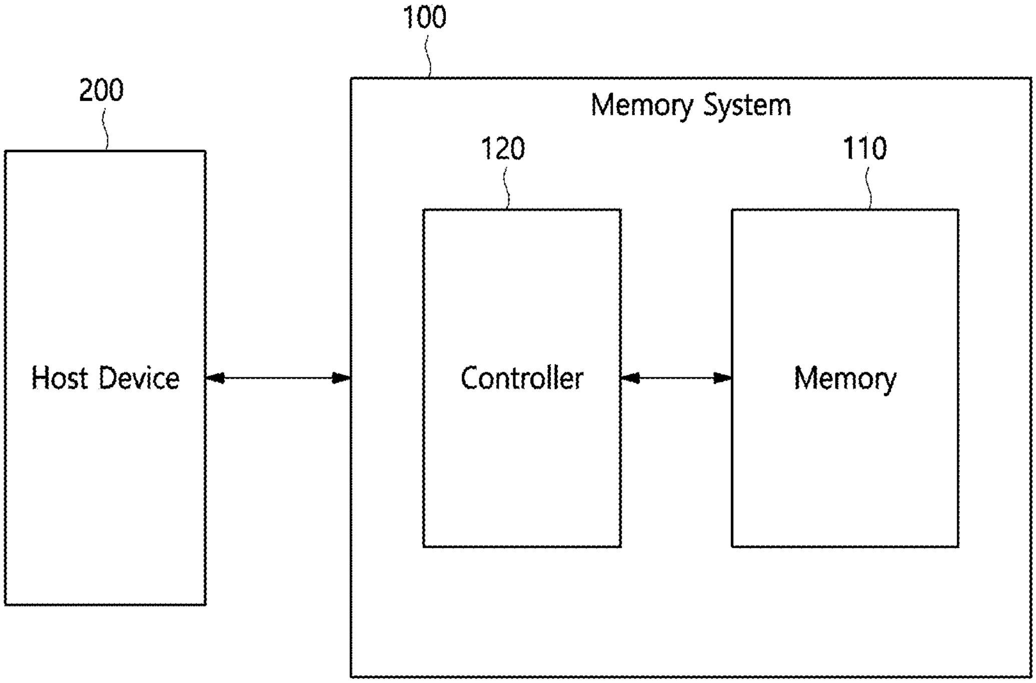
FIG. 1 illustrates an example of a schematic configuration of a memory system according to embodiments of the present disclosure.

In the following description of examples or embodiments of the present disclosure, reference will be made to the accompanying drawings in which it is shown by way of illustration specific examples or embodiments that can be implemented, and in which the same reference numerals and signs can be used to designate the same or like components even when they are shown in different accompanying drawings from one another. Further, in the following description of examples or embodiments of the present disclosure, detailed descriptions of well-known functions and components incorporated herein will be omitted when it is determined that the description may make the subject matter in some embodiments of the present disclosure rather unclear. The terms such as "including", "having", "containing", "constituting" "make up of", and "formed of" used herein are generally intended to allow other components to be added unless the terms are used with the term "only". As used herein, singular forms are intended to include plural forms unless the context clearly indicates otherwise.

Terms, such as "first", "second", "A", "B", "(A)", or "(B)" may be used herein to describe elements of the present disclosure. Each of these terms is not used to define essence, order, sequence, or number of elements etc., but is used merely to distinguish the corresponding element from other elements.

When it is mentioned that a first element "is connected or coupled to", "contacts or overlaps" etc. a second element, it should be interpreted that, not only can the first element "be directly connected or coupled to" or "directly contact or overlap" the second element, but a third element can also be "interposed" between the first and second elements, or the first and second elements can "be connected or coupled to", "contact or overlap", etc. each other via a fourth element. Here, the second element may be included in at least one of two or more elements that "are connected or coupled to", "contact or overlap", etc. each other.

When time relative terms, such as "after," "subsequent to," "next," "before," and the like, are used to describe processes or operations of elements or configurations, or flows or steps in operating, processing, manufacturing methods, these terms may be used to describe non-consecutive or non-sequential processes or operations unless the term "directly" or "immediately" is used together.

In addition, when any dimensions, relative sizes etc. are mentioned, it should be considered that numerical values for an elements or features, or corresponding information (e.g., level, range, etc.) include a tolerance or error range that may be caused by various factors (e.g., process factors, internal or external impact, noise, etc.) even when a relevant description is not specified. Further, the term "may" fully encompasses all the meanings of the term "can".

Hereinafter, various embodiments of the present disclosure will be described in detail with reference to accompanying drawings.

FIG. 1 illustrates an example of a schematic configuration of a memory system 100 according to embodiments of the present disclosure.

Referring to FIG. 1, a memory system 100 according to embodiments of the present disclosure may include at least one memory 110. In this specification, a memory 110 or a memory system 100 may be referred to as a memory device. The memory system 100 may include a controller 120 which controls at least one memory 110. In this specification, the controller 120 may be referred to as a control device.

The memory 110 may be, for example, a volatile memory such as DRAM, SDRAM, DDR SDRAM, and LPDDR SDRAM, but the memory 110 according to embodiments of the present disclosure is not limited thereto. The memory 110 may also be a non-volatile memory such as a NAND flash memory, a 3D NAND flash memory, and a NOR flash memory. In addition, some of the memory 110 included in the storage device 100 may be volatile memory, and others may be non-volatile memory.

In addition, the memory 110 may be one of various types of memory, such as a resistive memory (e.g., ReRAM), a phase-change memory, a magnetoresistive memory, a ferroelectric memory, or a spin transfer torque-magnetic memory (e.g., SST-MRAM). In addition, the memory 110 may be a processing-in-memory having an operation function or a data processing function, depending on the case.

The controller 120 may control an operation of the memory 110 based on a command received from an external device or an internal command. For example, the controller 120 may control an operation of writing data to the memory 110 or reading data written to the memory 110. Alternatively, the controller 120 may be separately arranged from a memory controller which directly controls the write/read operation of the memory 110, and may perform various controls on the memory 110 or perform processing or management on data stored in the memory 110.

The controller 120 may communicate with a device located outside the memory system 100, and may control an operation of the memory 110. The memory system 100 may be, for example, a device which communicates with an external device and operates based on a compute express link (CXL) standard, and the controller 120 may communicate with an external device and control the memory 110 according to the CXL standard. In this case, the controller 120 may be referred to as a CXL controller, distinct from a memory controller above described. In addition, the embodiments of the present disclosure may also be applied to a memory system 100 which communicates with an external device according to another interface, such as PCIe, other than the CXL standard.

The controller 120 may control the operation of the memory 110 according to a command and data received from a host device 200 located outside the memory system 100.

The host device 200 may be a computer, an ultra-mobile PC (UMPC), a workstation, a personal digital assistant (PDA), a tablet, a mobile phone, a smartphone, an e-book, a portable multimedia player (PMP), a portable game player, a navigation device, a black box, a digital camera, a digital multimedia broadcasting (DMB) player, a smart television, a digital audio recorder, a digital audio player, a digital picture recorder, a digital picture player, a digital video recorder, a digital video player, a storage configuring a data center, one of various electronic devices configuring a home network, one of various electronic devices configuring a computer network, one of various electronic devices configuring a telematics network, an RFID (radio frequency identification) device, and a mobility device (e.g., a vehicle, a robot or a drone) capable of driving under human control or autonomous driving, as non-limiting examples. Alternatively, the host device 200 may be a virtual reality (VR) device providing 2D or 3D virtual reality images or an augmented reality (AR) device providing augmented reality images. In addition to the examples described above, the host device 200 may be any one of various electronic devices that require a memory system 100 capable of storing data.

The host device 200 may include at least one operating system (OS). The operating system may generally manage and control the function and operation of the host device 200, and may control interoperability between the host device 200 and the storage device 100. The operating system may be classified into a general operating system and a mobile operating system depending on the mobility of the host device 200.

The host device 200 and the controller 120 may be separate devices. In some cases, the controller 120 and the host device 200 may be implemented as integrated into a single device. In this case, the function of the controller 120 may be implemented by being included in the host device 200, and the memory system 100 may only include a memory controller for controlling the direct operation of the memory 110. Hereinafter, for convenience of explanation, it will be described an example in which the controller 120 is located in the memory system 100 separately from the host device 200, but the embodiments of the present disclosure are not limited thereto.

The memory system 100 may receive various messages other than a read command or a write command from the host device 200. The memory system 100 may perform control operations according to various messages. Various messages received from the host device 200 may be processed by the controller 120 of the memory system 100.

Figure 2:
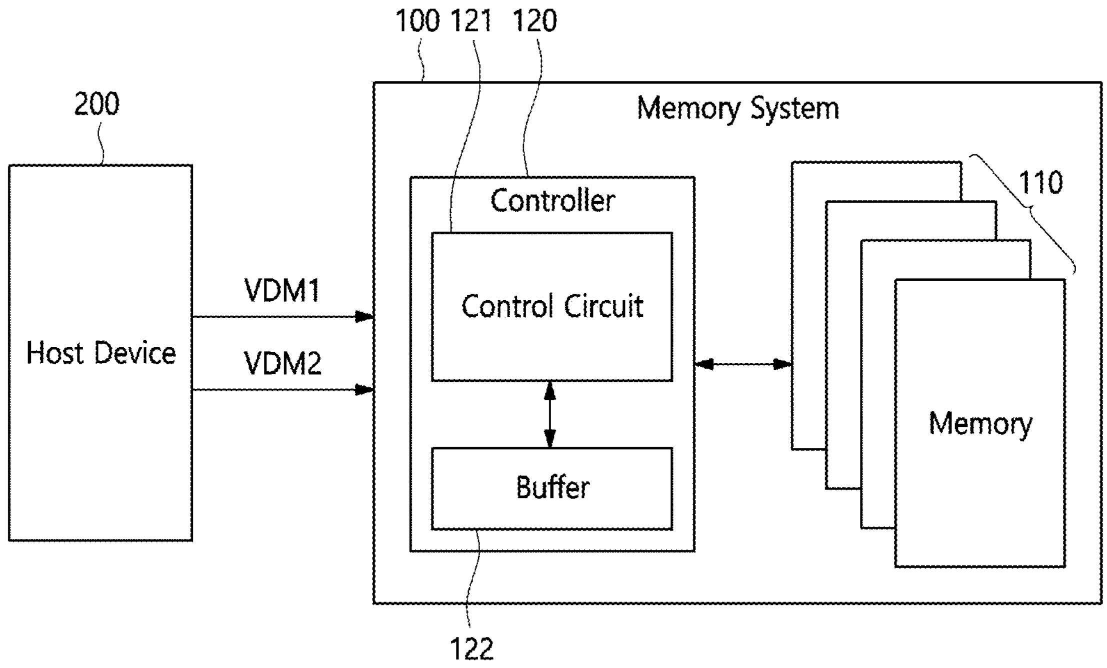
FIG. 2 illustrates an example of the configuration of a controller included in a memory system according to embodiments of the present disclosure.

FIG. 2 illustrates an example of the configuration of a controller 120 included in a memory system 100 according to embodiments of the present disclosure.

Referring to FIG. 2, the memory system 100 may include a plurality of memories 110. The memory system 100 may include a controller 120 which controls the plurality of memories 110. Each of the plurality of memories 110 may include a memory controller which directly controls a write operation or a read operation of the memory 110. The controller 120 may be implemented separately from the memory controller, and in some cases, may be implemented to include at least a part of the functions of the memory controller.

The controller 120 of the memory system 100 may include, for example, a control circuit 121 and a buffer 122. The control circuit 121 may control the overall operation of the controller 120. The buffer 122 may be a volatile memory, and may be, for example, an SRAM, but is not limited thereto. The control circuit 121 and the buffer 122 may be implemented in a single chip form, or in some cases, the buffer 122 may be located outside the controller 120. The control circuit 121 and the buffer 122 may be combined to be referred to as a controller 120 or a control device.

The memory system 100 may receive various types of messages from the host device 200. The controller 120 of the memory system 100 may perform control operations according to various types of messages received from the host device 200.

A message transmitted from the host device 200 may be referred to as a user-defined message or a provider-defined message. The host device 200 may perform control for management of the memory system 100 or control for a specific operation through the user-defined message.

The controller 120 of the memory system 100 may store messages received from the host device 200 in the buffer 122 and process the messages. The buffer 122 may allocate a region or an area for storing various types of messages. Each of the various types of messages may be stored and processed in a specific region included in the buffer 122.

As an example, the memory system 100 may receive a first message VDM1 and a second message VDM2 from the host device 200. In some cases, the memory system 100 may receive three or more types of user-defined messages from the host device 200.

The controller 120 may directly process a message and provide feedback to the host device 200 according to the characteristics of the first message and the second message received from the host device 200. Alternatively, the controller 120 may store the first message and the second message received from the host device 200 in the buffer 122, and may process the first message and the second message sequentially.

The controller 120 may divide and manage a region storing the first message and a region storing the second message separately in the buffer 122.

Figure 3:
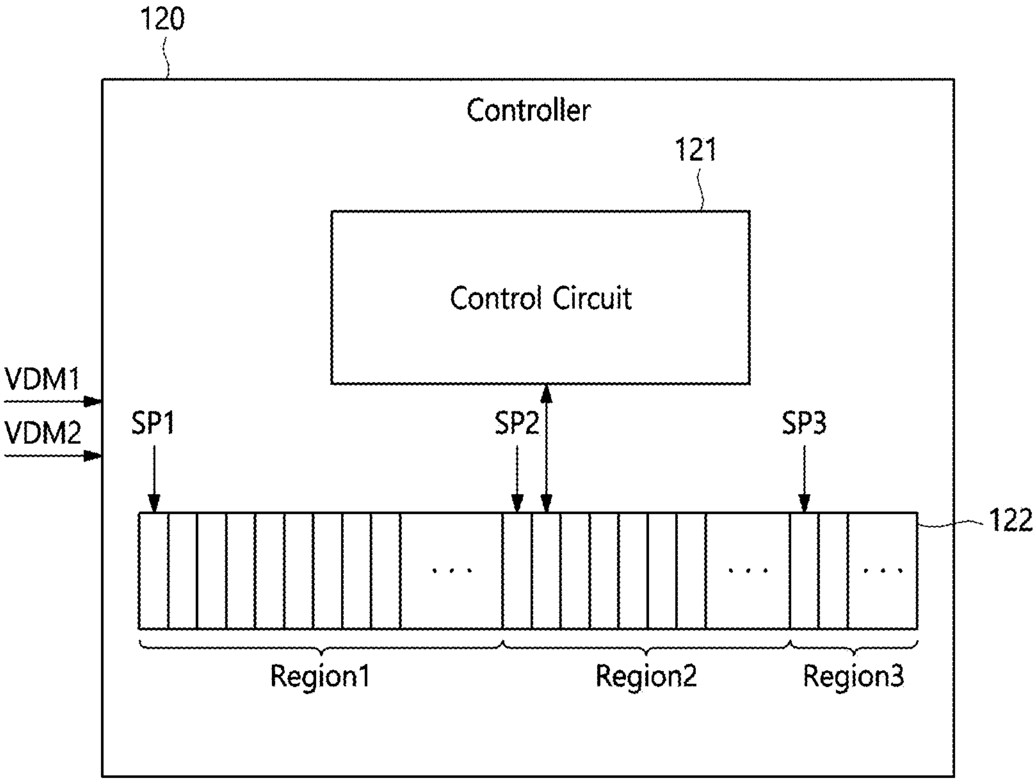
FIG. 3 illustrates an example of a structure of a buffer included in a controller of a memory system according to embodiments of the present disclosure.

FIG. 3 illustrates an example of a structure of a buffer 122 included in a controller 120 of a memory system 100 according to embodiments of the present disclosure.

Referring to FIG. 3, the buffer 122 of the controller 120 may be divided into two or more regions. The example of FIG. 3 illustrates a case where the buffer 122 includes a first region, a second region, and a third region.

The controller 120 may store a first message received from the host device 200 in the first region of the buffer 122. The controller 120 may store a second message received from the host device 200 in the second region of the buffer 122. The controller 120 may use the third region of the buffer 122 to store other messages or data other than the first message or the second message.

The first region of the buffer 122 may be indicated by a first starting point SP1. The second region of the buffer 122 may be indicated by a second starting point SP2. The third region of the buffer 122 may be indicated by a third starting point SP3. The first region, the second region, and the third region may be distinct regions. At least a portion of the first region, the second region, and the third region may be arranged sequentially.

The controller 120 may sequentially store and process messages received from the host device 200 in each region of the buffer 122 from a portion indicated by the starting point.

As an example, when the controller 120 receives a first message from the host device 200, the controller 120 may store the first message in the first region of the buffer 122. The controller 120 may store and manage the value of the first starting point for the first region of the buffer 122, and a point value of the last portion where the first message is stored or a point value of the next portion in a register.

When receiving a second message from the host device 200, the controller 120 may store the second message in the second region of the buffer 122. The controller 120 may store and manage the value of the second starting point for the second region of the buffer 122, and a point value of the last portion where the second message is stored or a point value of the next portion in the register.

The controller 120 may sequentially store and process various types of messages in each allocated region of the buffer 122.

In addition, the controller 120 may variably set the size of each region of the buffer 122, and process messages based on at least one of the remaining capacity of the buffer 122, the size of messages stored in each region of the buffer 122, or the ratio of unprocessed messages in each region of the buffer 122.

Figure 4:
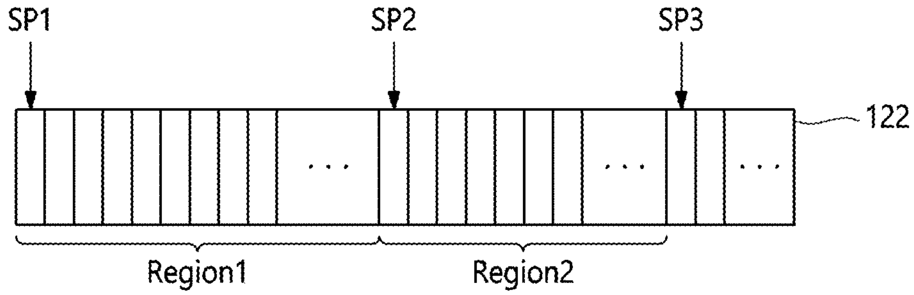
FIGS. 4 to 6 illustrate examples of a method of managing a buffer by a controller of a memory system according to embodiments of the present disclosure.
Figure 4:
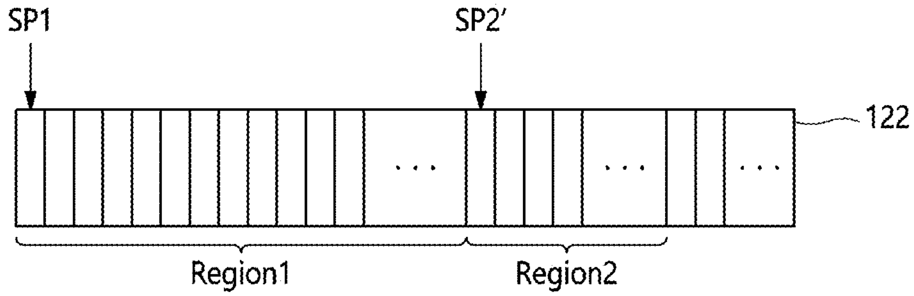
Figure 4:
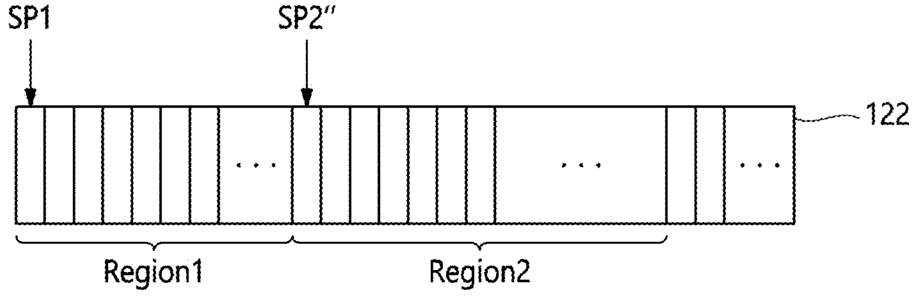
Figure 5:
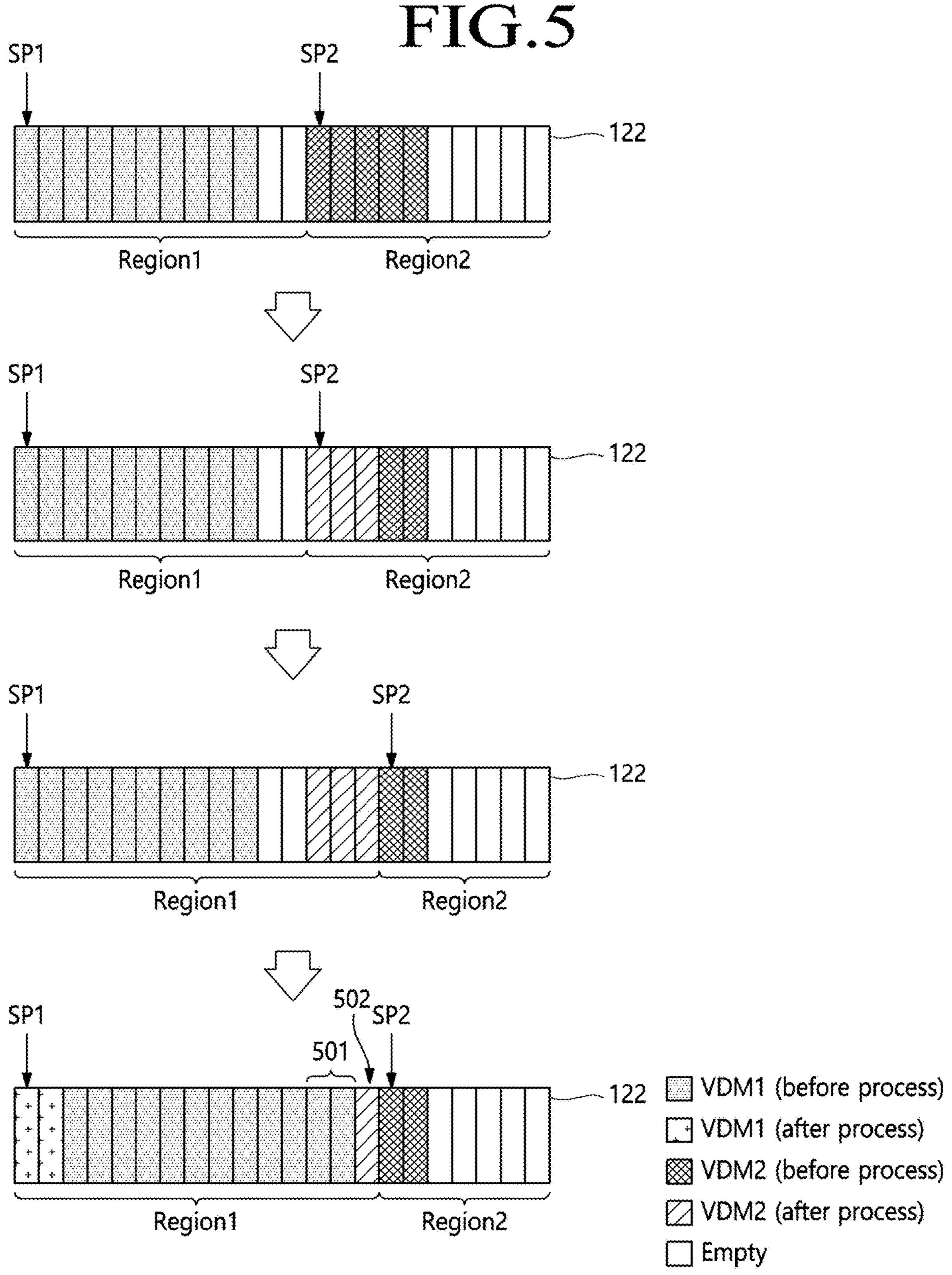
Figure 6:
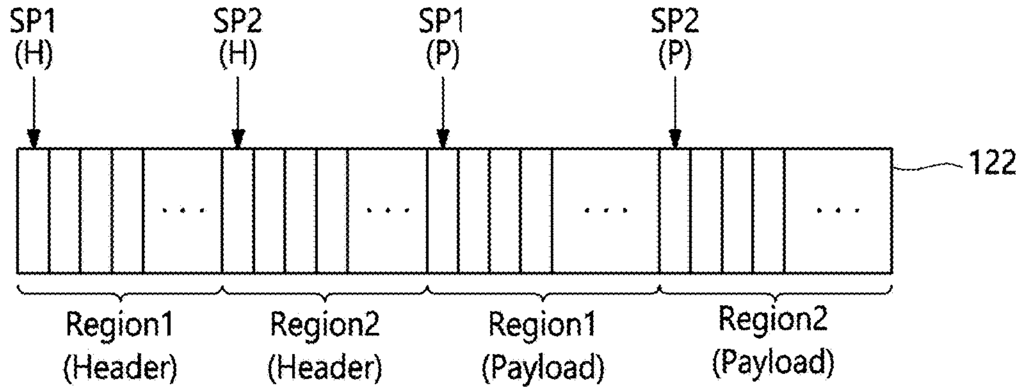
Figure 6:
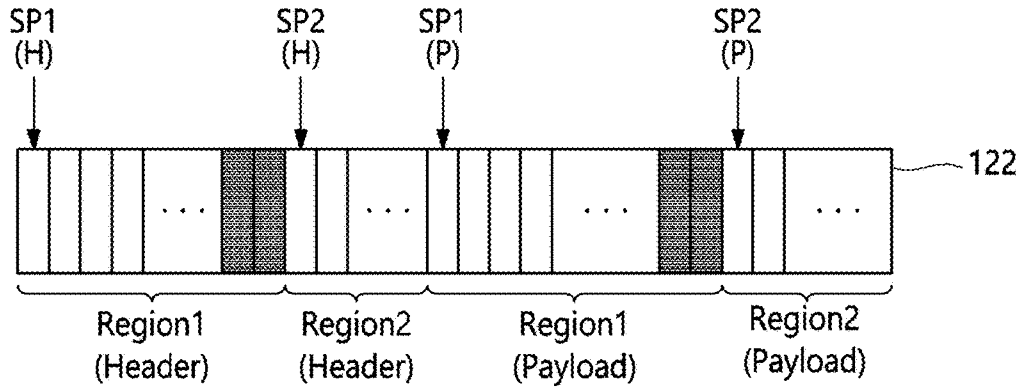
Figure 6:
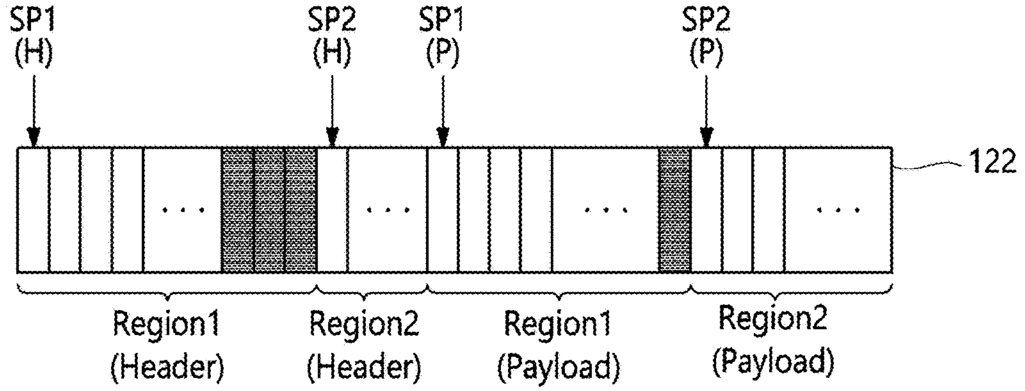
Figure 6:

FIGS. 4 to 6 illustrate examples of a method of managing a buffer 122 by a controller 120 of a memory system 100 according to embodiments of the present disclosure.

Referring to FIG. 4, the buffer 122 may include a first region and a second region. The first region and the second region may be regions allocated to store messages received from the host device 200. The buffer 122 may include only the first region and the second region, or may include additional regions other than the first region and the second region.

The first region may be a region storing a first message of a first type received from the host device 200. The second region may be a region storing a second message of a second type received from the host device 200.

The sum of a size of the first region and a size of the second region in the buffer 122 may be constant. While the total size of the first region and the second region is maintained at a constant value, the size of the first region and the size of the second region may be variably set.

For example, as shown in the example illustrated in <Default> of FIG. 4, a first portion of the first region of the buffer 122 may be indicated by a first starting point SP1. The controller 120 may store and manage the value of the first starting point in a register. A first portion of the second region of the buffer 122 may be indicated by a second starting point SP2. The controller 120 may store and manage the value of the second starting point in a register.

The controller 120 may variably set at least one of the first starting point of the first region or the second starting point of the second region. The controller 120 may variably set both the first starting point of the first region and the second starting point of the second region, or can variably set only one of the first starting point of the first region and the second starting point of the second region.

As an example, the controller 120 may maintain the first starting point of the first region at a fixed value, and variably set the second starting point of the second region. Alternatively, the controller 120 may maintain the second starting point of the second region at a fixed value, and variably set the first starting point of the first region.

FIG. 4 illustrates an example in which the controller 120 variably sets the second starting point of the second region while maintaining the first starting point of the first region at a fixed value, but the embodiments of the present disclosure may also be applied to a case in which only the first starting point of the first region is variably set. The controller 120 may store and manage the value of the second starting point of the second region through a register.

The controller 120 may variably set the second starting point of the second region based on a type and a reception frequency of the message received from the host device 200, for example. The controller 120 may change the second starting point of the second region so that the size of the first region can be increased if the reception frequency of first messages of the first type from the host device 200 is high. The controller 120 may change the second starting point of the second region so that the size of the second region can be increased if the reception frequency of second messages of the second type from the host device 200 is high.

The controller 120 may variably set the second starting point of the second region based on a ratio of the number of first messages stored in the first region and not processed to the number of first messages stored in the first region, or a ratio of the number of second messages stored in the second region and not processed to the number of second messages stored in the second region.

For example, the controller 120 may change the second starting point of the second region to adjust the size of the first region or the second region if the ratio of the first messages not processed in the first region is greater than or equal to a preset threshold value (e.g., 80%), or the ratio of the second messages not processed in the second region is greater than or equal to a preset threshold value.

The threshold value serving as a criterion for changing the size of the first region and the threshold value serving as a criterion for changing the size of the second region may be the same. The controller 120 may change the second starting point of the second region so as to increase the size of the region in which the ratio of the unprocessed message is greater than or equal to the threshold value.

Alternatively, the controller 120 may change the second starting point of the second region to adjust the size of the first region or the second region if the ratio of unprocessed first messages in the first region is greater than or equal to a preset first threshold value, or if the ratio of unprocessed second messages in the second region is greater than or equal to a preset second threshold value.

The first threshold value and the second threshold value may be different. If an importance of the first message and an importance of the second message are different, or if a risk due to missing the first message and a risk due to missing the second message, which may be caused by an insufficient capacity of the buffer 122, are different, the first threshold value and the second threshold value may be set differently.

For example, if the importance of the first message is higher than the importance of the second message, the controller 120 may increase the size of the first region if the ratio of unprocessed first messages in the first region is 70% or more. The controller 120 may increase the size of the second region if the ratio of unprocessed second message in the second region is 80% or more.

The controller 120 may adjust the sizes of the first region and the second region, and variably set the second starting point of the second region so as to prevent the first message from being missed due to the insufficient capacity of the buffer 122.

In addition, the controller 120 may maintain the size of the first region and the size of the second region without changing if the ratio of first messages not processed in the first region is equal to or greater than the first threshold value and the ratio of second messages not processed in the second region is equal to or greater than the second threshold value.

The controller 120 may change the second starting point of the second region so that the size of the second region can be increased if the ratio of unprocessed first messages in the first region is less than the first threshold value and the ratio of unprocessed second messages in the second region is greater than or equal to the second threshold value.

The controller 120 may increase the size of the second region only if sufficient space is secured in the first region even when there are insufficient second regions for the second messages.

The controller 120 may change the second starting point of the second region, in some cases, to increase the size of the first region for the first message even when there is insufficient space in the second region.

As an example, the controller 120 may change the second starting point of the second region so as to increase the size of the first region in a state in which the ratio of unprocessed first messages in the first region is greater than or equal to the first threshold value and the ratio of unprocessed second messages in the second region is greater than or equal to the second threshold value.

In addition to the examples described above, the controller 120 may variably set the second starting point of the second region so as to change the size of the first region and the size of the second region based on various criteria.

The controller 120 may change the second starting point of the second region from SP2 to SP2', as in <Case A>, in the state shown in <Default>, to increase the size of the first region. The controller 120 may update the second starting point of the second region in the register.

The controller 120 may change the second starting point of the second region to SP2'', as in <Case B>, in the state shown in <Default> or <Case A>, to increase the size of the second region. The controller 120 may variably set the size of the first region and the size of the second region by changing the second starting point of the second region.

The controller 120 may set the second starting point of the second region, for example, when booting the memory system 100 or a computing system including the memory system 100 and the host device 200. The controller 120 may set the second starting point of the second region so as to increase or decrease the second region based on the previous operation record of the memory system 100 or the computing system.

Alternatively, the controller 120 may variably set the second starting point of the second region during the operation of the memory system 100. As in the example described above, the controller 120 may variably set the second starting point of the second region based on the frequency according to the type of message received from the host device 200 or the ratio of unprocessed messages in the first region and the second region.

The controller 120 may sequentially store and process messages in each of the first region and the second region. In addition, in the case that the second message is stored in a portion indicated by the second starting point, the controller 120 may perform an operation of processing the corresponding second message and changing the second starting point.

For example, FIG. 5 illustrates a state in which an unprocessed first message is stored in a portion of the first region of a buffer 122 and an unprocessed second message is stored in a portion of the second region.

The respective sizes of the first region and the second region may be set to be the same, or may be set differently depending on the characteristics of the messages stored in each region. FIG. 5 illustrates an example case in which the size of the first region is set to be larger than the size of the second region.

The ratio of unprocessed first messages in the first region may be greater than a threshold value. The ratio of unprocessed second messages in the second region may be smaller than the threshold value.

The controller 120 may change the second starting point of the second region to increase the size of the first region.

The controller 120 may check whether the second message is stored in a portion indicated by the second starting point in order to change the second starting point of the second region. The controller 120 may first perform an operation to process the second message stored in a second portion indicated by the second starting point, since an unprocessed second message is stored in that portion.

The second message stored in three portions including the portion indicated by the second starting point in the second region may be processed by the controller 120.

The controller 120 may change and set the second starting point after processing the second message stored in the portion indicated by the second starting point in the second region. The size of the first region may be increased by changing the second starting point. The size of the second region may be decreased.

The controller 120 may store the first message received from the host device 200 in a portion changed from the second region to the first region. As in the portion indicated by 501, the first message may be stored in a portion changed from the second region to the first region. As in the portion indicated by 502, the second message may be stored in a portion changed from the second region to the first region. The first message stored in the corresponding portion may be the second message whose processing has been completed.

The controller 120 may sequentially process the first message stored in a portion indicated by the first starting point in the first region. The controller 120 may determine whether to change the size of the region based on the ratio of unprocessed messages in each region, and may perform an operation of checking whether the message stored in a portion indicated by the starting point is processed in order to change the starting point and an operation of adjusting the size of each region in a state in which the processing of the corresponding message is completed.

Even when messages are stored and processed in the first region and the second region and unprocessed messages are stored in a portion indicated by the starting point, the controller 120 may variably adjust the first region and the second region through sequential message processing and change of the starting point, and efficiently process messages received from the host device 200.

The message received from the host device 200 may include, for example, a header portion and a payload portion, and in this case, each region of the buffer 122 may include a header region and a payload region.

As an example, referring to FIG. 6, a first message may include a first header and a first payload. A second message may include a second header and a second payload. Each of the first header and the second header may include fields storing various basic information associated with the first message and the second message. Each of the first payload and the second payload may include information indicating subjects to be managed or controlled by the first message and the second message.

The buffer 122 may include a first region and a second region. The first region may include a first header region storing a first header and a first payload region storing a first payload. The second region may include a second header region storing a second header and a second payload region storing a second payload.

The first header region and the first payload region may be arranged consecutively within the first region. The second header region and the second payload region may be arranged consecutively within the second region.

Alternatively, the first header region and the first payload region may be arranged non-contiguously. The second header region and the second payload region may be arranged non-contiguously.

For example, as shown in the example in FIG. 6, the buffer 122 may include a first header region in which a first header is stored and a second header region in which a second header is stored. The first header region and the second header region may be continuous or may be arranged consecutively. The first header region may be indicated by a first starting point SP1(H). The second header region may be indicated by a second starting point SP2(H).

The buffer (122) may include a first payload region in which a first payload is stored and a second payload region in which a second payload is stored. The first payload region and the second payload region may be continuous or may be arranged consecutively. The first payload region may be indicated by a first starting point SP1(P). The second payload region may be indicated by a second starting point SP2(P).

The controller 120 may, for example, maintain the first starting point SP1(H), SP1(P) as fixed values, and variably set the second starting point SP2(H), SP2(P).

Since the first header region and the second header region are continuous and the first payload region and the second payload region are continuous, the controller 120 may easily adjust the size of the first region and the size of the second region by only changing the second starting points SP2(H), SP2(P).

In addition, the controller 120 may change the second starting point SP2(P) based on the change of the second starting point SP2(H), or may change the second starting point SP2(P) independently of the change of the second starting point SP2(H).

For example, referring to <Case A>, there is illustrated an example case where the size of the first region is increased and the size of the second region is decreased. The second starting point SP2(H) may be changed according to the increase in the size of the first region. The second header region may decrease and the first header region may increase according to the change in the second starting point SP2(H). The <Case A> illustrates an example case where the first header region increases by two portions.

The controller 120 may change the second starting point SP2(P) based on the change in the second starting point SP2(H). The second payload region may decrease and the first payload region may increase according to the change in the second starting point SP2(P).

The <Case A> illustrates an example case where the first payload region increases by two portions, and the first payload region may increase in proportion to a rate at which the first header region increases. The controller 120 may change the size of the first payload region and the second payload region by changing the second starting point SP2(P)

based on the second starting point SP2(H) set to change the size of each of the first header region and the second header region.

Alternatively, the controller 120 may separately or independently change the size of the header region and the size of the payload region.

As an example, referring to <Case B>, there is illustrated a case in which the size of the first region is increased and the size of the second region is decreased.

The controller 120 may change the second starting point SP2(H) indicating a start of the second header region to increase the first header region. The first header region may be increased by three portions, and the second header region may be decreased by three portions.

The controller 120 may change the first payload region and the second payload region separately from the change of the first header region and the second header region. The controller 120 may change the second starting point SP2(P) indicating a start of the second payload region. The controller 120 may increase by one portion the first payload region and decrease by one portion the second payload region by changing the second starting point SP2(P). The controller 120 may change the second starting points SP2(H) and SP2(P) so that an increase ratio of the second header region and an increase ratio of the second payload region are different.

The above-described example is an example of the controller 120 changing the sizes of the header region and the payload region, and the sizes of the header region and the payload region may be changed or varied based on a transmission frequency or a reception frequency of the messages or a ratio of unprocessed messages in each region.

In the buffer 122, the first header region and the second header region may be positioned consecutively, and the first payload region and the second payload region may be positioned consecutively, so that the size of the entire header region and the size of the entire payload region may be fixed or constant, and the size of the first region (i.e., the first header region and the first payload region) and the size of the second region (i.e., the second header region and the second payload region) may be easily varied according to the state of the buffer 122.

The first message stored in the first header region and the first payload region and the second message stored in the second header region and the second payload region in the buffer 122 may be various messages.

The first message may be, for example, a power management message for power management of the memory system 100. The second message may be, for example, any one of control messages for various operations other than the power management message.

Depending on the memory system 100, the type of message received from the host device 200 may be set in various ways. The memory system 100 may variably set the first region and the second region of the buffer 122 to receive and process two types of messages such as a power management message and a control message, as in the example described above, and may manage the buffer 122.

Figure 7:
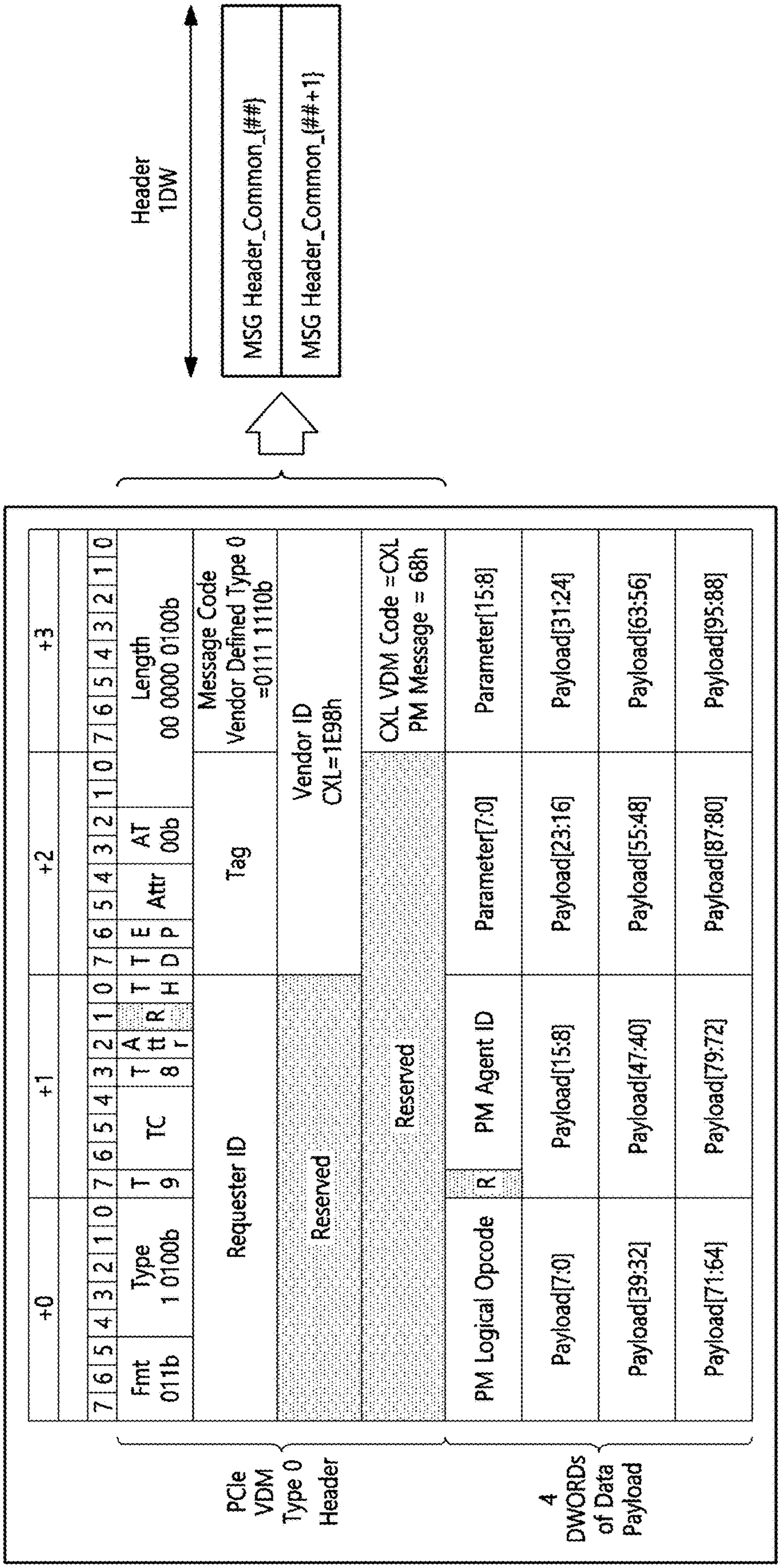
FIG. 7 illustrates an example of a first message received by a memory system according to embodiments of the present disclosure.
Figure 8:
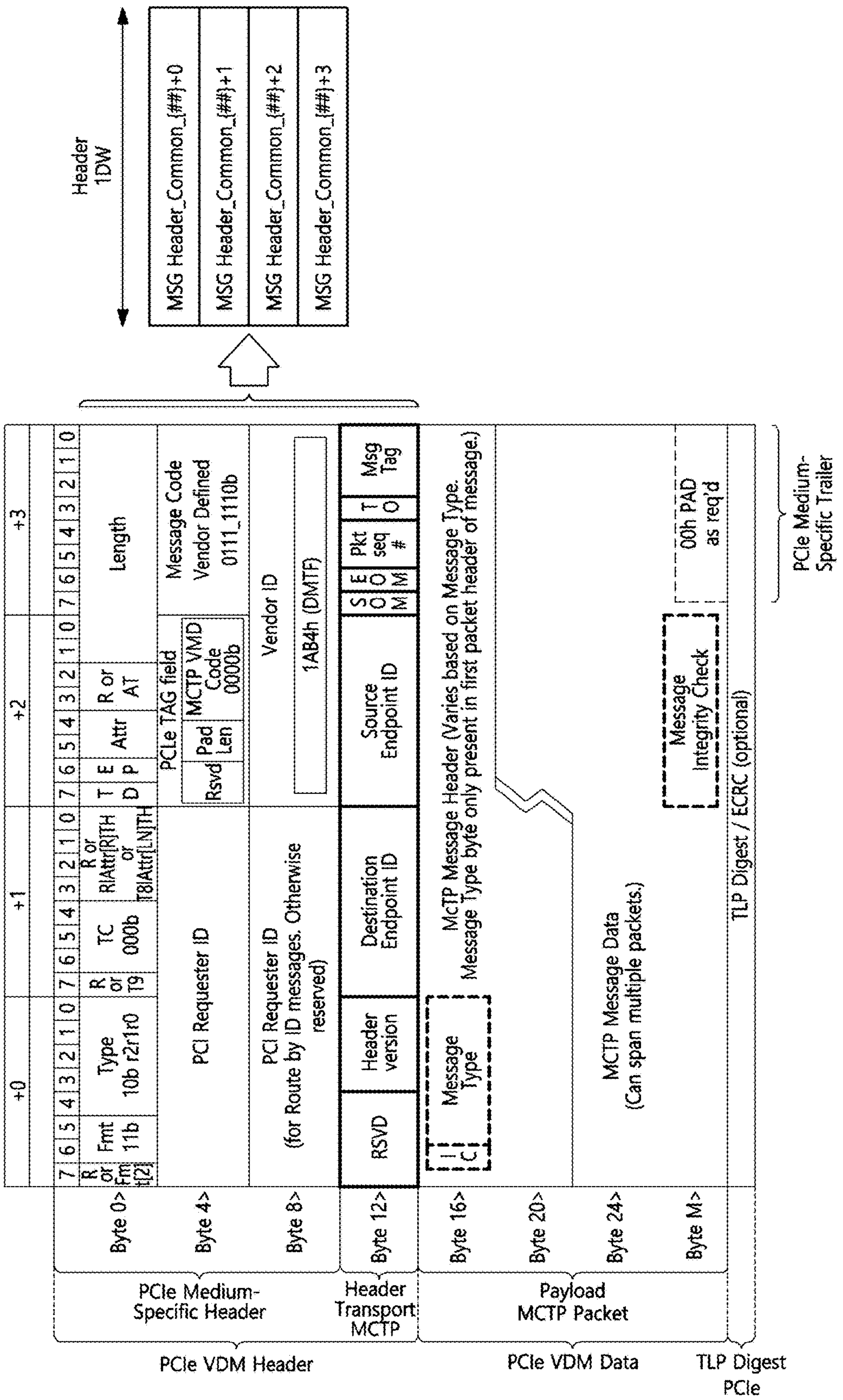
FIG. 8 illustrates an example of a second message received by a memory system according to embodiments of the present disclosure.

FIG. 7 illustrates an example of a first message received by a memory system 100 according to embodiments of the present disclosure. FIG. 8 illustrates an example of a second message received by a memory system 100 according to embodiments of the present disclosure.

Referring to FIG. 7, the first message may be a power management message defined in the CXL standard. FIG. 7 illustrates a packet format of a power management message defined in the CXL standard. The power management message may be a type of user-defined message, and may be a message defined as type 0. The power management message may include a header portion and a payload portion.

Information included in the header portion and information included in the payload portion in the power management message may be determined based on the content defined in 3.1.2 CXL power management Vendor Defined Message (VDM) format of the CXL standard. The content regarding the CXL power management message in this specification may be supported by the content included in the CXL standard.

When the controller 120 receives the first message, the controller 120 may organize at least some information of the header portion of the first message into two double word (Dword) units and store in the first header region of the buffer 122. One Dword may be, for example, 32 bits, and the controller 120 may organize the information of the header portion in the form of 64 bits.

The controller 120 may, for example, reconstruct the information of the Type 1_0100b field, the TC field, the EP field, the requestor ID field, and the tag field included in the header portion, and may store them in the first header region of the buffer 122.

A first header of the first message stored in the first header region of the buffer 122 may include information about a start address of the first header and a start address of a first payload in addition to the information described above. In addition, in some cases, the first header stored in the first header region may be configured and stored in various ways in addition to the examples described above.

The controller 120 may store information about a header portion of a power management message in the first header region of the buffer 122, and store information about a payload portion of the power management message in the first payload region. The size of the information included in the payload portion of the power management message may, for example, not differ significantly depending on the power management message, and may have a size within a specific range.

Referring to FIG. 8, a second message may be an MCTP message defined in a management component transport protocol (MCTP) PCIe VDM transport binding standard. The MCTP message may include various control messages.

The MCTP message may include a header portion corresponding to a PCIe VDM header and a payload portion corresponding to PCIe VDM data. The information included in the header portion of the MCTP message and the information included in the payload portion may correspond to the content defined in the Management Component Transport Protocol (MCTP) PCIe VDM Transport Binding standard. In this specification, the content regarding the MCTP message may be supported by the content described in the Management Component Transport Protocol (MCTP) PCIe VDM Transport Binding standard.

When the controller 120 receives a second message, the controller 120 may organize at least a part of the information included in a second header of the second message into four Dword units and store them in the second header region of the buffer 122. One Dword may be, for example, 32 bits, and the controller 120 may organize the information of the header portion into 128 bits and store them in the second header region.

A unit size of the header portion of the second message stored in the second header region may be different from a unit size of the header portion of the first message stored in the first header region. For example, as in the example described above, the unit size of the header portion of the second message may be larger than the unit size of the header portion of the first message.

The controller 120 may, for example, reconstruct information of a Type 10b r2r1r0 field, a TC 000b field, an EP field, a PCI Requester ID field, a PCIe TAG field field, a PCI Target ID field, a header version field, a Destination Endpoint ID field, a Source Endpoint ID field, and a SOM/EOM/Pkt seq #/TO/Msg Tag field among the information included in the header portion of the second message, and may store the reconstructed information in the second header region of the buffer 122.

The second header stored in the second header region of the buffer 122 may further include, in addition to the above-described information, information regarding a start address of the second header, a start address of the second payload, a size of the payload per packet, a size of the entire payload, etc.

The controller 120 may store at least a part of the information of the header portion of the second message in the second header region, and may store the information of the payload portion of the second message in the second payload region. The size of the payload portion of the MCTP message stored in the second payload region may be different for each MCTP message. A deviation in the size of the payload portion of the MCTP message may be greater than a deviation in the size of the payload portion of the power management message.

The controller 120 may store messages in the first region and the second region of the buffer 122 according to the reception of the first message which is the power management message, and the second message which is the MCTP message. The controller 120 may store and process the message by adjusting at least one of the size of the first region or the size of the second region according to a ratio of the messages stored in each region.

Figure 9A:
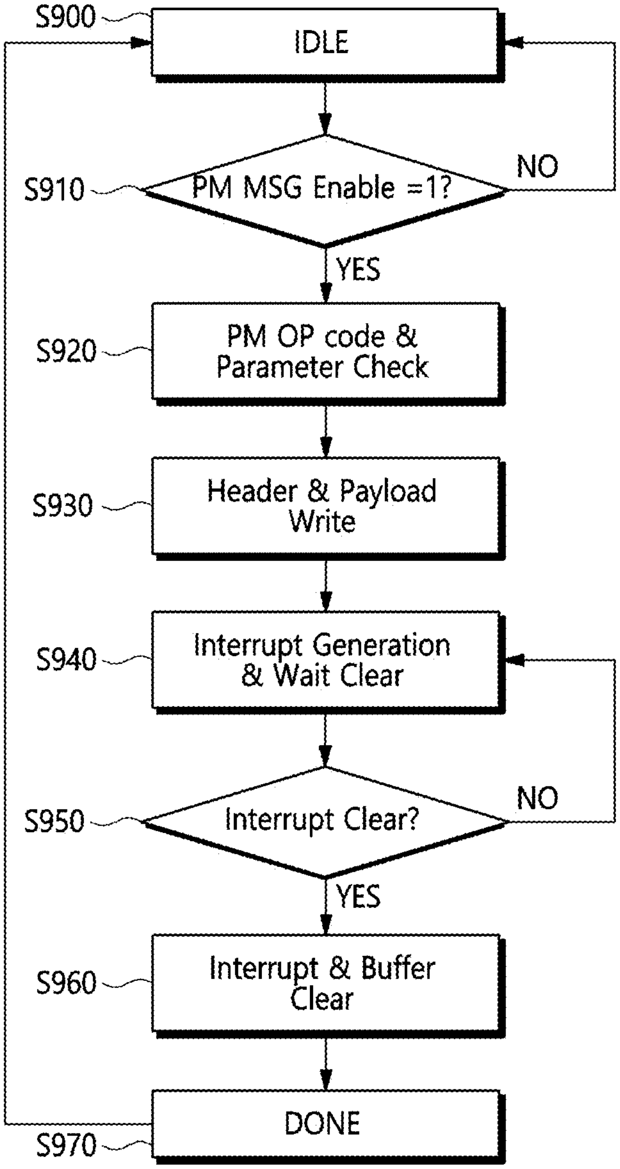
FIGS. 9A and 9B illustrate examples of a process in which a memory system according to embodiments of the present disclosure processes a message received from a host device.
Figure 9B:
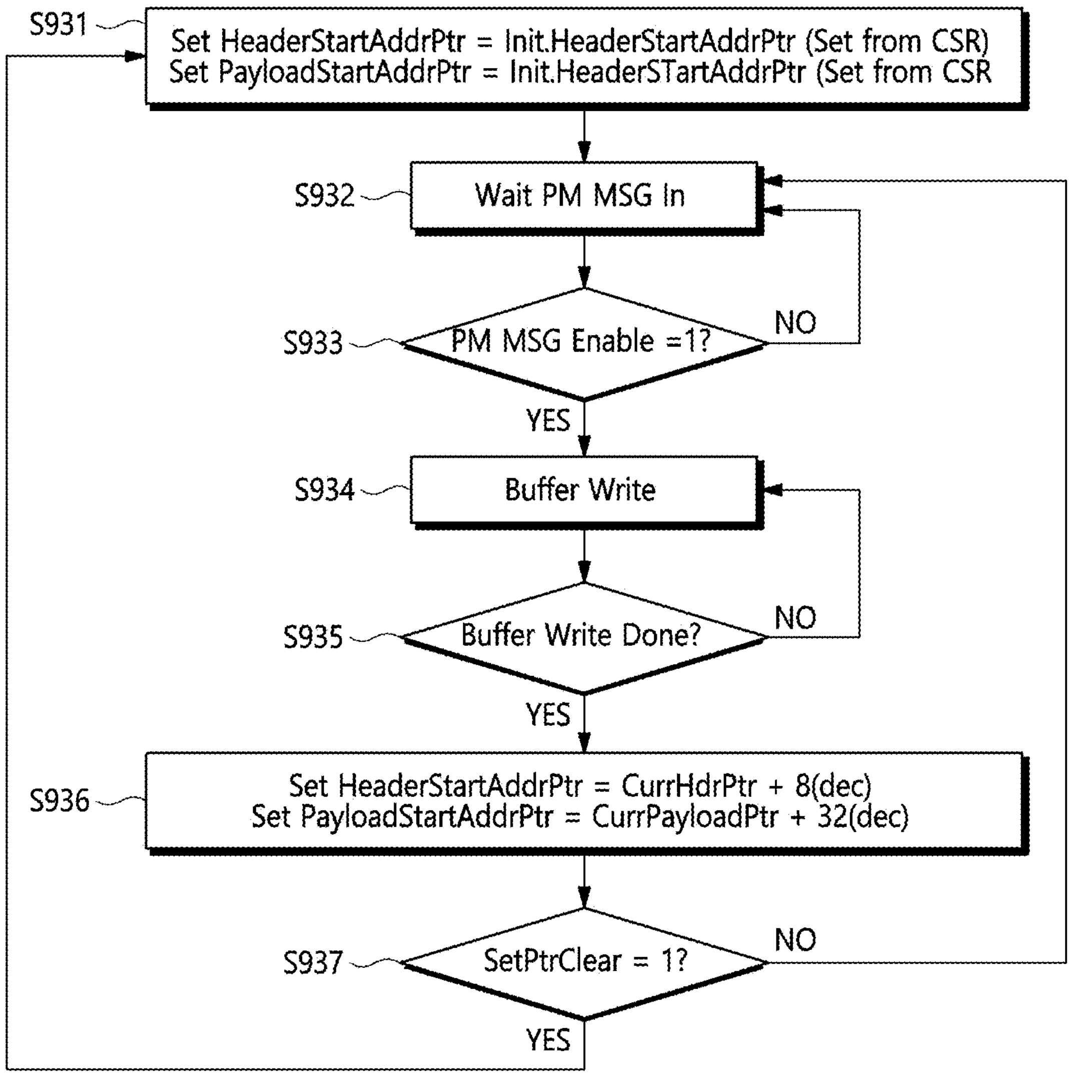

FIGS. 9A and 9B illustrate examples of a process in which a memory system 100 according to embodiments of the present disclosure processes a message received from a host device 200.

FIG. 9A illustrates an example of a process in which a controller 120 of a memory system 100 receives and processes a power management message from a host device 200.

The controller 120 may check whether power management message reception is enabled (S910) in an idle state (S900). For example, if an enable value of power management message reception is 1, the controller 120 may receive the power management message, and may check an OP code and parameters of the power management message (S920).

The controller 120 may write a header portion and a payload portion of the received power management message to the buffer 122 (S930).

The controller 120 may check a region for storing the power management message in the buffer 122 based on a starting point (or a start address) of the region storing the header portion and the payload portion of the power management message in the buffer 122, and may store the power management message.

As an example, referring to FIG. 9B, the controller 120 may set a start address pointer value of the first header region and a start address pointer value of the first payload region in the buffer 122 as initial values (S931). The initial values may be, for example, a start address of the first header region and a start address of the first payload region.

The controller 120 may wait for reception of the power management message (S932), and when the power management message is received (S933), the controller 120 may write the power management message to the buffer 122 based on the start address set as the initial value (S934).

When the writing of the power management message to the buffer 122 is completed (S935), the controller 120 may set the start address pointer value to indicate a portion corresponding to an address following an address where the power management message was written in the first header region and the first payload region in the buffer 122 (S936).

The controller 120 may check a pointer clear value (S937), and if the pointer clear value is set to 1, the controller 120 may reset the start address pointer value to the initial value, and if the pointer clear value is not set to 1, the controller 120 may write a following received power management message to the buffer 122 based on the start address pointer value currently set.

The controller 120 may write the power management message to the buffer 122 according to the above-described process, and may sequentially process the power management messages written to the buffer 122.

As an example, referring again to FIG. 9A, if a power management message is written to the buffer 122, the controller 120 may generate an interrupt for processing the corresponding power management message and wait for a completion of the processing of the power management message (S940). When the generated interrupt is cleared (S950), the controller 120 may clear the generated interrupt and the power management message stored in the buffer 122 (S960), and may complete the processing of the power management message (S970).

The controller 120 may perform, in response to receiving the power management, an operation of writing the power management message in the header region and the payload region of the buffer 122 and processing the power management message stored through the interrupt occurrence. The controller 120 may similarly process the message when receiving an MCTP message.

The controller 120 may receive and process the power management message or the MCTP message through the above-described process. In addition, the controller 120 may adjust the first region and the second region according to the reception frequency or processing ratio of the power management message and the MCTP message in order to receive and process each message.

Figure 10:
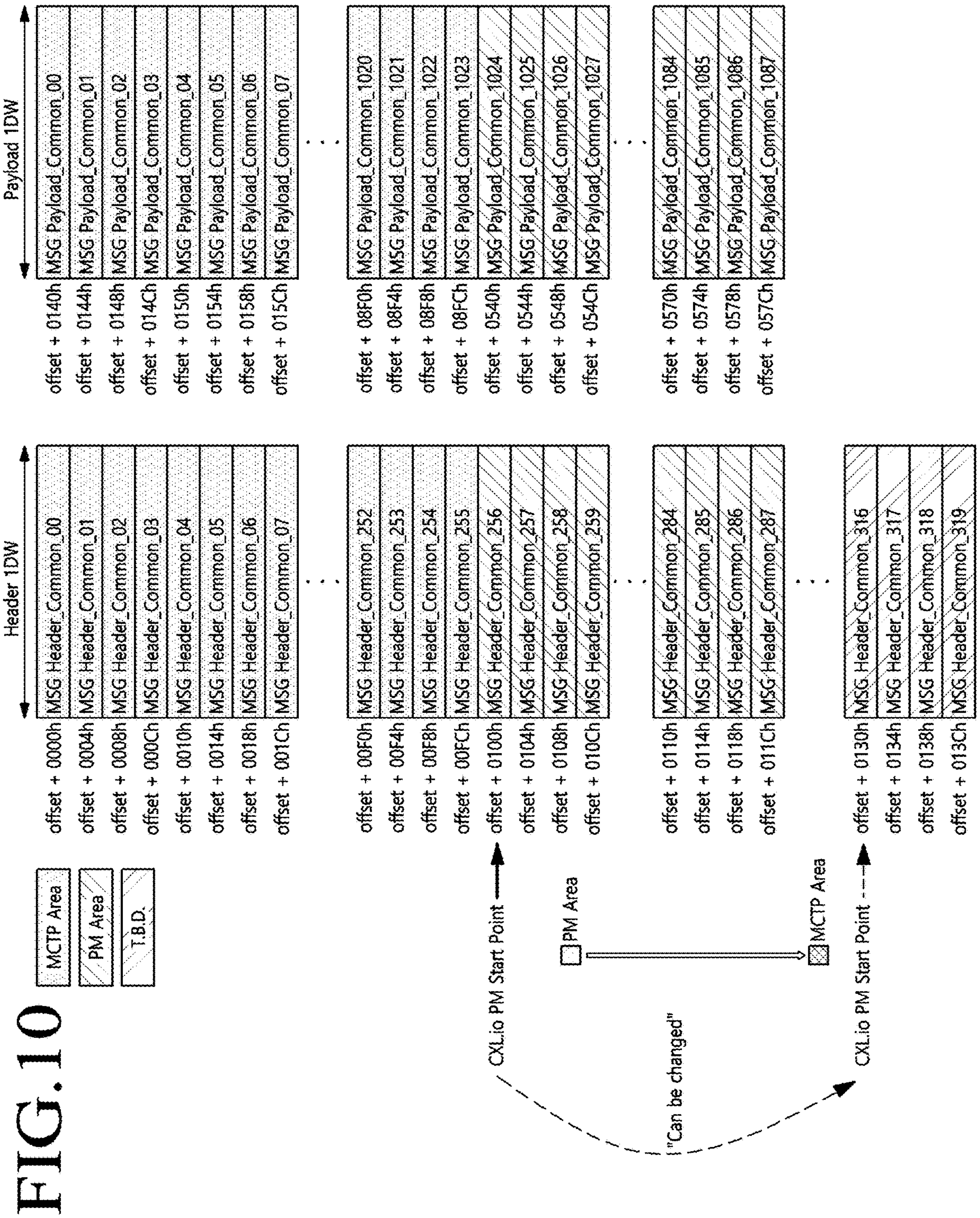
FIG. 10 illustrates a specific example of a method for adjusting each region of a buffer by a controller of a memory system according to embodiments of the present disclosure.

FIG. 10 illustrates a specific example of a method for adjusting each region of a buffer 122 by a controller 120 of a memory system 100 according to embodiments of the present disclosure.

FIG. 10 illustrates an example of controlling a first region and a second region and processing a message according to embodiments of the present disclosure for an example case of storing an MCTP message in the first region and storing a power management message in the second region.

As an example, the reception frequency or size of the power management message may be generally uniform, and the reception frequency or size of the MCTP message may vary more than that of the power management message. The MCTP message may be stored in the first region so as to maintain a first starting point of the first region at a fixed value. Meanwhile, a second starting point of the second region may be changed to increase or decrease the size of the first region for storing the MCTP message.

A first header region storing a header portion of the MCTP message and a second header region storing a header portion of the power management message may be contiguous. A first payload region storing a payload portion of the MCTP message and a second payload region storing a payload portion of the power management message may be contiguous.

The starting point of the first header region may be, for example, 0000h, and the starting point of the second header region may be 0100h. If it is required to increase the size of the first header region storing the header portion of the MCTP message, the controller 120 may change the starting point of the second header region from 0100h to, for example, 0130h. As the starting point of the second header region is changed, the size of the first header region may increase.

The controller 120 may change the starting point of the second payload region according to the change in the starting point of the second header region. Alternatively, the controller 120 may also change the starting point of the second payload region independently of the change in the starting point of the second header region.

According to the embodiments of the present disclosure, the total size of the first region storing the MCTP message and the second region storing the power management message in the buffer 122 included in the controller 120 may be maintained to be constant, and the size of the first region and the size of the second region may be easily adjusted by changing the starting point of the first region or the second region.

In addition, the first header region of the first region and the second header region of the second region may be arranged continuously, and the first payload region of the first region and the second payload region of the second region may be arranged continuously, thereby easily adjusting the header region and the payload region.

It is possible to variably set the header region and payload region, which are included in the buffer 122 and store each message. Accordingly, the controller 120 of the memory system 100, which receives and processes various types of messages, may process messages without an omission even using a limited buffer 122, thereby improving the operating performance of the memory system 100.

In addition, the embodiments of the present disclosure may be implemented, for example, through the setting of firmware driven by the controller 120 for the operation of the memory system 100. Therefore, it is possible to easily implement the embodiments of the present disclosure, and the embodiments of the present disclosure may be widely expanded and applied in various structures in which a type of the memory system 100, a type of the host device 200, or the host device 200 and the controller 120 are implemented.

Based on embodiments of the disclosed technology described above, the operation delay time of the memory system may be advantageously reduced or minimized. In addition, based on an embodiment of the disclosed technology, an overhead occurring in the process of calling a specific function may be advantageously reduced or minimized. Although various embodiments of the disclosed technology have been described with particular specifics and varying details for illustrative purposes, those skilled in the art will appreciate that various modifications, additions and substitutions may be made based on what is disclosed or illustrated in the present disclosure without departing from the spirit and scope of the invention as defined in the following claims.

What is claimed is:

1. A memory system comprising:

at least one memory storing data; and a controller including a buffer storing at least a part of a message received from an external device, and configured to store a first message of a first type in a first region of the buffer and store a second message of a second type in a second region continuous with the first region of the buffer, wherein the first region includes a first header region storing a first header of the first message and a first payload region storing a first payload of the first message, and the second region includes a second header region storing a second header of the second message and a second payload region storing a second payload of the second message, wherein the controller variably sets a starting point of the first header region, a starting point of the second header region, or both, and, wherein the controller variably sets a starting point of the first payload region, a starting point of the second payload region, or both.

2. The memory system of claim 1, wherein, when the starting point of at least one of the first header region or the second header region is changed, the controller sets the starting point of at least one of the first payload region or the second payload region to a changed value based on the changed starting point.

3. The memory system of claim 1, wherein the controller independently performs a change of the starting point of at least one of the first header region or the second header region, and a change of the starting point of at least one of the first payload region or the second payload region.

4. The memory system of claim 1, wherein a unit size of the first header region is different from a unit size of the second header region.

5. The memory system of claim 1, wherein the first header region and the second header region are contiguous, and the first payload region and the second payload region are contiguous.

6. The memory system of claim 1, wherein the controller changes the starting point of at least one of the first region or the second region when at least one of a ratio of messages which are not processed in the first region and a ratio of messages which are not processed in the second region is greater than a preset threshold value.

7. The memory system of claim 1, wherein, when a ratio of messages which are not processed in the first region is greater than or equal to a first threshold value, or a ratio of the second messages which are not processed in the second region is greater than or equal to a second threshold value, the controller changes the starting point of at least one of the first region or the second region.

8. The memory system of claim 1, wherein, when a ratio of messages which are not processed in the first region is greater than or equal to a first threshold value, and a ratio of messages which are not processed in the second region is greater than or equal to a second threshold value, the controller does not change the starting point of each of the first region and the second region, wherein, when a ratio of the messages which are not processed in the first region is less than a first threshold value, and a ratio of the messages which are not processed in the second region is greater than or equal to the second threshold value, the controller changes the starting point of at least one of the first region or the second region.

9. The memory system of claim 1, wherein the controller increases a size of the first region by changing the starting point of at least one of the first region or the second region in a state in which a ratio of messages which are not processed in the first region is greater than or equal to a first threshold value, and a ratio of messages which are not processed in the second region is greater than or equal to a second threshold value.

10. The memory system of claim 1, wherein, when a processing of the first message stored in a portion corresponding to a starting point of the first region or the second message stored in a portion corresponding to a starting point of the second region is completed, the controller changes the starting point of at least one of the first region and the second region.

11. The memory system of claim 1, wherein, in a state in which the first message which has been processed is stored in a portion corresponding to a first point which is a starting point of the first region, the controller changes the starting point of the first region to a second point and stores the second message in a portion corresponding to the first point.

12. The memory system of claim 1, wherein the controller variably sets the starting point of the first region, and maintains the starting point of the second region at a fixed value.

13. The memory system of claim 1, wherein a size of the first region and a size of the second region are changed according to a change in the starting point of at least one of the first region and the second region, and the sum of the size of the first region and the size of the second region is maintained to be constant.

14. The memory system of claim 1, wherein the first message of the first type is a power management message, and the second message of the second type is a control message other than the power management message.

15. A control device comprising:

a buffer including a first region storing a first message of a first type and a second region storing a second message of a second type; and a control circuit configured to store at least a part of the first message and the second message received from an external device in the buffer, wherein the first region includes a first header region storing a first header of the first message and a first payload region storing a first payload of the first message, and the second region includes a second header region storing a second header of the second message and a second payload region storing a second payload of the second message, and wherein the control circuit is configured to: variably set a starting point of the first header region, a starting point of the second header region, or both; and variably set a starting point of the first payload region, a starting point of the second payload region, or both.

16. The control device of claim 15, wherein the control circuit variably sets the starting point of the first header region and the starting point of the first payload region, and maintains the starting point of the second header region and the starting point of the second payload region at fixed values.

17. A computing system comprising:

a host device for transmitting a first message of a first type and a second message of a second type to the outside; and a memory device including a buffer with a first region storing the first message and a second region storing the second message, and configured to variably set a starting point of the first region a starting point of the second region, or both based on at least one of an amount of messages of the first type and an amount of messages of the second type received from the host device during a unit period or a ratio of the messages of the first type and the messages of the second type which are not processed in the buffer, and process the first message and the second message.

* * * * *